No. 620,190. Patented Feb. 28, 1899.
F. A. SHARPNECK.
ANTIFRICTION BEARING.
(Application filed July 26, 1898.)
(No Model.)
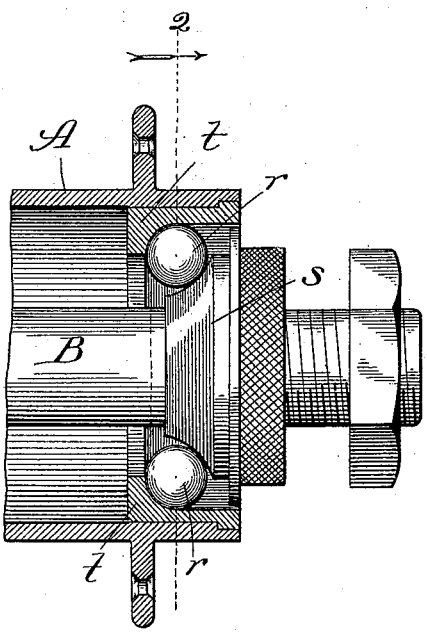
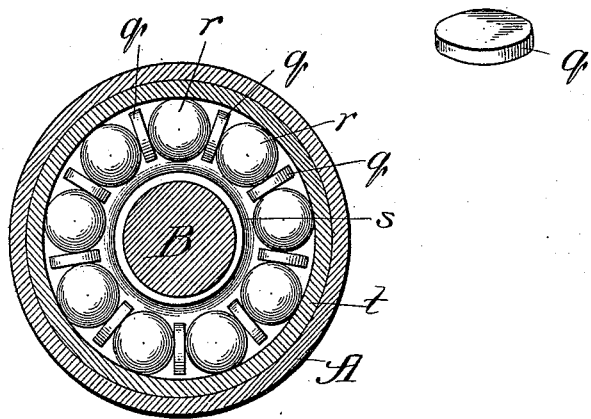
Witnesses:
Chas. E. Gaylord,
Luts S. Alter
Inventor:
Frank A. Sharpneck,
By Dyrenforth & Dyrenforth,
Attys.

UNITED STATES PATENT OFFICE.

FRANK A. SHARPNECK, OF CHICAGO, ILLINOIS, ASSIGNOR OF TWO-THIRDS TO ELIEL L. SHARPNECK, OF SAME PLACE, AND GEORGE PRAY SMITH, OF NEW YORK, N. Y.

ANTIFRICTION-BEARING.

SPECIFICATION forming part of Letters Patent No. 620,190, dated February 28, 1899.

Application filed July 26, 1898. Serial No. 686,894. (No model.)

*To all whom it may concern:*

Be it known that I, FRANK A. SHARPNECK, a citizen of the United States, residing at Chicago, in the county of Cook and State of Illinois, have invented a new and useful Improvement in Antifriction-Bearings, of which the following is a specification.

My invention relates to improvements in antifriction-bearings for shafts, wheels, or other movable bodies; and my object is to provide an improved construction of ball-bearing which will give thereto great antifriction properties and dispense with the use of oil or other similar lubricant.

One application of my invention may be to the ball-bearings of bicycle wheels and pedals.

In the drawings, Figure 1 is a broken section of a bicycle or similar wheel bearing provided with my improvements; Fig. 2, a section taken on line 2 of Fig. 1, and Fig. 3 a perspective view of one of the spacing-disks employed.

A is the hub of a bicycle or similar wheel, carrying the outer annular ball-race member $t$. B is a shaft carrying the inner ball-race member or cone $s$. Fitting between the bearing-surfaces of the members $s$ $t$ are bearing-balls $r$, which may be of steel, and interposed between the said balls are disk-shaped spacing-pieces $q$. The balls $r$ with the interposed spacing-disks $q$ may substantially fill out the annulus and the balls $r$ contact with the bearing-surfaces of both race members $t$ $s$. The disks $q$ are of more or less smaller diameter than the balls and are arranged with their axes at right angles to the axis of the shaft. It is a well-known fact that in ball-bearings of this description where the bearing-balls contact with each other the movement of the balls against each other tends to produce friction greatly in excess of the friction of the balls against the race members. The disks $q$ may revolve on their own axes in the plane at right angles to the direction of rotation of the balls, so that friction between the parts is reduced to a degree where lubricating-oil is unnecessary to prevent heating of parts.

In practice I prefer to construct the balls $r$ of steel and the disks $q$ of vulcanized fiber. While I have found vulcanized fiber to answer the purpose in this connection better than any other material of which I am aware, I do not wish to limit my invention in its broadest sense to the use of vulcanized fiber for the disks $q$. The disks $q$ may be of any desired thickness, and while it is preferable to have the balls and disks fill out the annulus there may be slight play between the balls and disks in the sense of their not quite filling out the annulus.

My improvement may be employed in all or nearly all cases where ball-bearings are desirable.

What I claim as new, and desire to secure by Letters Patent, is—

1. In a ball-bearing, the combination with the shaft and race members, of bearing-balls between the race members, and interposed rotatable disks spacing said balls apart, said disks being of smaller diameter than said balls and arranged with their axes at right angles to the axis of the shaft, substantially as described.

2. In a ball-bearing, the combination with the race members, of bearing-balls between the race members, and interposed rotatable disks of vulcanized fiber spacing said balls apart, said disks being of smaller diameter than said balls, substantially as described.

FRANK A. SHARPNECK.

In presence of—
 J. H. LEE,
 D. W. LEE.